(12) United States Patent
Kurman et al.

(10) Patent No.: US 7,773,284 B2
(45) Date of Patent: Aug. 10, 2010

(54) RESONANT CAVITY ELECTROCHROMIC DEVICE

(75) Inventors: Eric W. Kurman, Healdsburg, CA (US); Roger W. Phillips, Santa Rosa, CA (US)

(73) Assignee: Soladigm, Inc., Milpitas, CA (US)

( * ) Notice: Subject to any disclaimer, the term of this patent is extended or adjusted under 35 U.S.C. 154(b) by 31 days.

(21) Appl. No.: 12/241,331

(22) Filed: Sep. 30, 2008

(65) Prior Publication Data

US 2010/0079844 A1 Apr. 1, 2010

(51) Int. Cl.
*G02F 1/15* (2006.01)
*G02F 1/03* (2006.01)

(52) U.S. Cl. ........................ 359/265; 359/260
(58) Field of Classification Search ......... 359/265–275, 359/260
See application file for complete search history.

(56) References Cited

U.S. PATENT DOCUMENTS

| | | | |
|---|---|---|---|
| 4,799,745 A | | 1/1989 | Meyer et al. |
| 5,076,673 A | * | 12/1991 | Lynam et al. ............... 359/271 |
| 5,680,245 A | * | 10/1997 | Lynam ........................ 359/265 |
| 5,757,537 A | | 5/1998 | Ellis, Jr. et al. |
| 6,493,128 B1 | * | 12/2002 | Agrawal et al. ............. 359/265 |
| 6,842,276 B2 | * | 1/2005 | Poll et al. ................... 359/265 |
| 7,256,924 B2 | * | 8/2007 | Guarr et al. ................. 359/265 |
| 7,339,728 B2 | | 3/2008 | Hartig |

OTHER PUBLICATIONS

P.H. Berning et al., "Induced Transmission in Absorbing Films Applied To Band Pass Filter Design," Journal of the Optical Society of America, vol. 47, No. 3. Mar. 1957, pp. 230-239.
C.M. Lampert, "Toward large-area photovoltaic nanocells: experiences learned from smart window technology," Solar Energy Materials and Solar Cells, 32 (1994), pp. 307-321.
B.V. Landau et al., Theory of Induced-Transmission Filters In Terms Of Concept of Equivalent Layers, Journal of the Optical Society of America, vol. 62, No. 11, Nov. 1972, pp. 1258-1264.

\* cited by examiner

*Primary Examiner*—Timothy J Thompson
*Assistant Examiner*—Tuyen Q Tra
(74) *Attorney, Agent, or Firm*—Joseph P. Curtin, L.L.C.

(57) ABSTRACT

One exemplary embodiment of an electrochromic device comprises a single cavity Fabry-Pérot filter in which the metal conductive layers forming the cavity are sandwiched by conductive dielectric layers. Another exemplary embodiment of an electrochromic device comprises a dual-cavity Fabry-Pérot filter.

23 Claims, 15 Drawing Sheets

RESONANT CAVITY ELECTROCHROMIC DEVICE

BACKGROUND

The present patent application relates to electrochromic devices. More particularly, the present patent application relates to electrochromic devices utilizing Fabry-Pérot resonance cavities to maximize the dynamic range between the bleached and colored states of the electrochromic device.

The field of electrochromics is extensive and has been developing over about the last forty years. In one application, an electrochromic coating is used for controlling the amount of light and heat passing through the window based on a user-controlled electrical potential that is applied across the optical stack of the electrochromic coating. Not only can an electrochromic coating reduce the amount of energy used for room heating and/or air conditioning, an electrochromic coating can also be used for providing privacy. By switching between a clear state having an optical transmission of about 60-80% and a colored state having an optical transmission of between 0.1-10%, both energy flow into a room through a window and privacy provided by the window can be controlled. The amount of glass used for various types of windows, such as skylights, aircraft windows, residential and commercial building windows, and automobile windows, is on the order of one billion square meters per year. Accordingly, the potential energy saving provided by electrochromic glazing is substantial. See, for example, Solar Energy Materials and Solar Cells, (1994) pp. 307-321.

Over the forty years that electrochromics have been developing, various structures for electrochromic devices have been proposed including, solution-phase electrochromic devices, solid-state electrochromic devices, gasochromic devices, and photochromic devices.

For example, a conventional electrochromic cell generally is structured as follows: a substrate, a transparent conductive layer, a counter electrode, an ion transport layer, an electrochromic layer, and a transparent conductive layer. Conventional cathodic materials, commonly referred to as "electrochromic electrodes," have included tungsten oxide $WO_3$ (most common), vanadium oxide $V_2O_5$, niobium oxide $Nb_2O_5$ and iridium oxide $IrO_2$. Anodic materials, commonly referred to as "counter electrodes," include nickel oxide NiO, tungsten-doped nickel oxide, and iridium oxide $IrO_2$. The ion layer materials exhibit a poor electron conduction, but good ion conduction. Examples of ion layer materials include $SiO_2$, $TiO_2$, $Al_2O_3$, and $Ta_2O_5$.

Various types of transparent conducting thin films have been employed for the first and second transparent conducting layers, such as, indium tin oxide (ITO), which is the most commonly used material. Other thin oxide layers have also been used, such as fluorine-doped tin oxide, antimony-doped tin oxide, aluminum-doped zinc oxide, and fluorine-doped zinc oxide. Regardless which thin film is used, conductivities of less than about 20 Ohms/□ are needed in order to produce a uniform voltage between the two conductive layers across the conductive layers. Even lower conductivities than about 20 Ohms/□ are needed for large panes of glass measuring 3-4 feet across.

If a voltage of between 1-4 Volts is applied between the first and second transparent conducting layers, the following reactions take place. At the anode, the following reaction takes place:

Metal Oxide or Polymer or Organic Molecule (Colored)+ $xM^+$+xe ↔Metal Oxide or Polymer or Organic Molecule (Transparent).

At the cathode, the following reaction takes place:

Metal Oxide or Polymer or Organic Molecule (Transparent)+$xM^+$+$xe^-$ ↔Metal Oxide or Polymer or Organic Molecule (Colored).

in which M is $H^+$, $Li^+$ or $Na^+$, e is an electron, and x is an integer.

Fabry-Pérot filters are well known and have been used in a variety of optical filter applications ranging from narrow- and wideband pass filters to colored films to winter-based solar-controlled window films. Winter-based solar-controlled window films have been found to be useful in northern climates where solar light and heat transmission desirably through a window from the outside while room heat is rejected back into a room. For example, U.S. Pat. No. 4,799,745 to Meyer et al. relates to a heat-reflecting composite film that is used for various window film constructions. More recently, U.S. Pat. No. 7,339,728 to Hartig discloses low-emissivity (low-e) coatings for use on glass windows that are effective for reflecting infrared radiation. In embodiment, a Hartig coating comprises silver reflectors that are separated about 56 nm to about 65 nm by a dielectric spacer—a space that is too small for accommodating a reliably functioning electrochromic device.

U.S. Pat. No. 5,757,537 to Ellis, Jr. et al. relates to an electrochromic device that utilizes optical tuning to minimize optical interference between layers of the electrochromic device and to maximize uniform optical transparency. In one disclosed embodiment, shown in FIG. 11 of Ellis, Jr. et al., two metal conductive layers formed from, for example, Ag, Al or Cu, sandwich the cathodic electrochromic (EC) layer, the ion conductor (IC) layer and the anodic counter electrode (CE) of an electrochromic device. That is, the electrochromic (EC) layer is in contact with one metal conductive layer and the counter electrode (CE) is in contact with the other metal conductive layer. According to Ellis, Jr. et al., for this embodiment to achieve maximum optical transmission in a chosen wavelength between about 400 nm and 650 nm, the combined thicknesses of the three layers of the electrochromic device are constrained to be as thin as possible. If the three layers of the electrochromic device are selected to have indices of refraction of about 2.2, then their combined thicknesses, based on optical modeling, would be about 50 nm thick or about 300 nm thick.

The first modeled thickness of about 50 nm is near the practical lower limit for the thickness of an ion conductor (IC) film for an electrochromic device. Defects, such as pinholes and excessive electronic conductivity, begin to impair the reliable functioning of an electrochromic device when the thickness of the ion conductor (IC) layer is less than about 50 nm. Consequently, if the total thickness of an EC device is limited to about 50 nm, there is insufficient thickness to form a good ion conductor layer, and certainly there is insufficient thickness to make a reliably functioning electrochromic device. For the second modeled thickness of about 300 nm, if the IC layer is formed to have a thickness of at least about 50 nm, about 250 nm of thickness remains that can be apportioned between the EC and the CE layers, which presents a number of drawbacks. For example, when the metal conductor layers of the Fabry-Pérot filter are formed from silver, the silver is not protected from the EC layers and the lithium or proton ions. Moreover, the silver used for the metal conductor layers is pure silver, which makes the metal conductor layer susceptible to corrosion. Further, the dynamic range between the bleached and colored state, that is, the ratio of the spectral transmittance of the bleached state to the colored state, of the electrochromic device is limited because the EC and CE layers are so relatively thin. Notably, U.S. Pat. No. 5,757,537 to Ellis, Jr. et al. does not disclose what the reflected and transmission values are in the colored state.

Additionally, this particular embodiment of Ellis, Jr. et al. is a monolithic structure in which the components are between two glass panes. That is, a structure in which there is no air space between the two panes of glass. Such a structure has the disadvantage of having a lower thermal insulation than a structure in which there is an airspace between the two panes of glass.

BRIEF DESCRIPTION OF THE DRAWINGS

The subject matter disclosed herein is illustrated by way of example and not by limitation in the accompanying figures in which like reference numerals indicate similar elements and in which.

DETAILED DESCRIPTION

Figure 1:
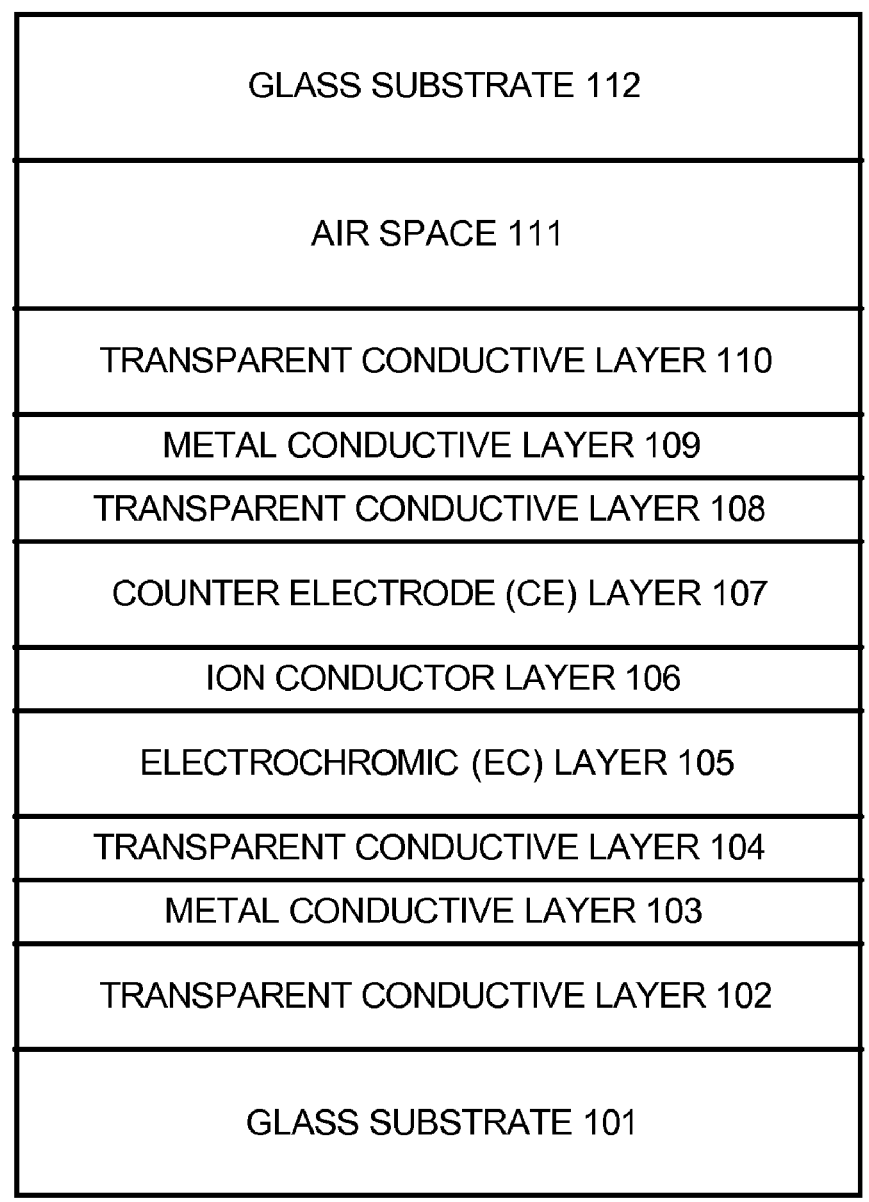
FIG. 1 depicts an exemplary embodiment of an electrochromic device according to the subject matter disclosed herein.

As used herein, the word "exemplary" means "serving as an example, instance, or illustration." Any embodiment described herein as "exemplary" is not to be construed as necessarily preferred or advantageous over other embodiments. Additionally, as used herein, the term "dynamic range" means the ratio of the spectral transmittance between the bleached and colored states of an electrochromic device. Further, the particular spectral transmittance referred to by the term "dynamic range" can include conditions in which the spectral transmittance is adjusted or weighted depending on the measurement parameters. For one non-limiting example, the spectral transmittance could be based on a CIE photopic response curve using illuminant C or illuminant D65, over a spectral range of about 380 nm to about 780 nm for visual transmittance or color use. As another non-limiting example, the spectral transmittance could be based on a spectral range of about 400 nm to about 2500 nm using a solar spectrum for energy modeling calculations.

The subject matter disclosed herein relates to electrochromic devices in which the electrochromic layers are used in an induced-transmitting structure using metal conductive layers. More particularly, the subject matter disclosed herein relates to electrochromic devices that utilize Fabry-Pérot resonance cavities for providing a dynamic range of at least 12:1 between the bleached and colored states of the electrochromic device, and that are not limited to a total thickness between the conductive metal layers of 300 nm or less. One exemplary embodiment that utilizes a two-cavity design provides an extremely low transmittance in the colored EC state so that variations in the colored state are minimized. Another exemplary embodiment provides an architectural window that utilizes a low-e coating with an electrochromic device having Fabry-Pérot-type resonance cavities for providing high solar insulation with high transmission that is controllably changeable to high solar insulation with low transmission for privacy. Yet another exemplary embodiment provides an architectural window in which the low-e coating comprises a metal reflector layer that operates as one of the metal conductive layers of a Fabry-Pérot-type resonance cavity.

Conventional large-area electrochromic windows suffer from adverse voltage drops because transparent conducting oxides are used for the conducting electrodes of the electrochromic device. The adverse voltage drops cause a "bull's eye" effect or a "curtain" effect, depending on the placement of the bus bars connected to the transparent conductive oxides, to appear in the window when the window transitions between the colored state and the bleached state during application of a control voltage. The subject matter disclosed herein overcomes this drawback to provide an architectural window that minimizes the reflected color at normal and at an angle, as viewed from either the outside or the inside of the building, thereby providing a uniform visual effect for large area windows and having enhanced solar performance and safety.

Additionally, the subject matter disclosed herein uses thinner transparent conductive coatings, such as ITO, that generally slow the fabrication process in the vacuum deposition of the electrochromic stack. Thinner ITO coatings allow a higher throughput during vacuum disposition and, consequently, a more cost-competitive product.

One exemplary embodiment of an electrochromic device according to the subject matter disclosed herein comprises two or more thin layers of a metal conductive layer, such as silver and/or a silver-based alloy, that are sandwiched between two conductive dielectric layers. The silver and/or silver-based alloy layers are protected by the conductive dielectric layers, thereby providing an electrochromic device having enhanced durability. That is, insertion of an additional transparent conductive oxide, such as ITO, on the inside of each metal conductive layer (silver and/or silver-based alloy) between the metal conductive layer and the three layers of the electrochromic device prevents ion diffusion. Addition of a small amount of Cu, Au or Pd in the metal conductive layer enhances durability of the metal conductive layer. The sandwiched metal conductor layers, in turn, sandwich the three layers of an electrochromic device. According to the theory of induced transmission, only silver and the silver-based alloys have the correct n and k (real and imaginary indices of refraction) as a reflector to work efficiently in the visible part of the electromagnetic spectrum as a cavity resonance device.

The simplest configuration for a single resonance cavity is given approximately as: reflector/half wave dielectric/reflector. For a double resonance cavity, the configuration is given approximately as: reflector/half wave dielectric/reflector/half wave dielectric/reflector. In practice, the dielectric layer between the silver layers is thinner than a full half wave due to phase changes at the layer interfaces. If additional dielectric layers are added to the outside reflectors, the transmittance can be further enhanced. A full discourse on the theory of induced transmittance can be found, for example, in H. A. Macleod, "Thin Film Optical Filters", McGraw-Hill publishing Company, $2^{nd}$ ed., 1989. p. 292, and in publications by P. H. Berning and A. F. Turner, J. Opt. Soc. Am. 47, Number 3, 230 (1957); and B. V. Landau and P. H. Lissberger, J. Opt. Soc. Am. 62, 1258 (1972).

FIG. 1 depicts an exemplary embodiment of an electrochromic device 100 according to the subject matter disclosed herein. Electrochromic device 100 comprises a glass substrate 101, a first transparent conductive dielectric layer 102, a first metal conductive layer 103, a second transparent conductive dielectric layer 104, a cathodic electrochromic (EC) layer 105, an ion conductor (IC) layer 106, an anodic counter electrode layer (CE) 107, a third transparent conductive dielectric layer 108, a second metal conductive layer 109, a fourth transparent conductive dielectric layer 110, air space 111, and glass substrate 112. It should be understood that the relative positions of electrochromic (EC) layer 105 and counter electrode (CE) layer 107 with respect to ion conductor (IC) layer 106 of the electrochromic structure could be reversed. That is, electrochromic device 100 could be formed so that a counter electrode (CE) layer is formed on transparent conductive layer 104, an ion conductor (IC) layer is formed on the counter electrode layer and an electrochromic (EC) layer is formed on the ion conductor layer. Additionally, electrical connections to the electrochromic device are made in a well-known manner, but are not shown in FIG. 1 for clarity.

Glass substrates 101 and 112 are typically a float glass having an index of refraction of about 1.52. Transparent conductive dielectric layers 102, 104, 108 and 110 are formed in a well-known manner from, for example, indium tin oxide (ITO), fluorine-doped tin oxide, antimony-doped tin oxide, or fluorine-doped zinc oxide. Metal conductive layers 103 and 109 are formed in a well-known manner from silver (Ag). Alternatively, addition of a small amount of Cu, Au or Pd in the metal conductive layer enhances durability of the metal conductive layer. Metal conductor layers 103 and 109 could be formed in a well-known manner from Al or Cu, but would provide a transmittance in the bleached state for the electrochromic device that would be less than if Ag or if a small amount of Cu, Au or Pd were used the Ag for the metal conductor layer. This alternative embodiment could be used for applications in which privacy is a higher priority. Electrochromic (EC) layer 105 is formed in a well-known manner from, for example, tungsten oxide $WO_3$, vanadium oxide $V_2O_5$, niobium oxide $Nb_2O_5$, or iridium oxide $IrO_2$. Ion conductor (IC) layer 106 is formed in a well-known manner from, for example, tantalum oxide $Ta_2O_5$, silicon oxide $SiO_2$, titanium oxide $TiO_2$, and aluminum oxide $Al_2O_3$, or mixtures of these compounds. Counter electrode (CE) layer 107 is formed in a well-known manner from, for example, nickel oxide NiO, tungsten-doped nickel oxide, and iridium oxide $IrO_2$. Alternatively, counter electrode (CE) layer 107 could be formed in a well-known manner from ternary oxide alloys such as NiO:$WO_3$:$MoO_3$, NiO:$MoO_3$:$Ta_2O_5$, and NiO:$WO_3$:$Ta_2O_5$.

For the exemplary embodiment depicted in FIG. 1, the first and fourth transparent conductive dielectric layers 102 and 110 are formed to have a thickness of about 40 nm. The first and second metal conductive layers 103 and 109 are formed to have a thickness of about 6 nm. The second and third transparent conductive dielectric layers 104 and 108 are formed to have a thickness of about 6 nm. Electrochromic (EC) layer 105 and counter electrode (CE) layer 107 are formed to have a thickness of about 250 nm. Ion conductor layer 106 is formed to have a thickness of about 50 nm to 150 nm. Air space 111 for a particular embodiment of an insulated glass unit (IGU) would have a thickness, or width, that would be selected to minimize both conductive heat transport and convective heat transport. Typically for an insulated glass unit (IGU), the thickness of the glass ranges from about 3 mm to about 6 mm for each lite. Generally, decreasing the air space thickness increases conductive transport. Increasing air space thickness above the optimum air space thickness increases convective loss. Generally, the optimum air space thickness is taken to be about 12 mm.

Figure 2:
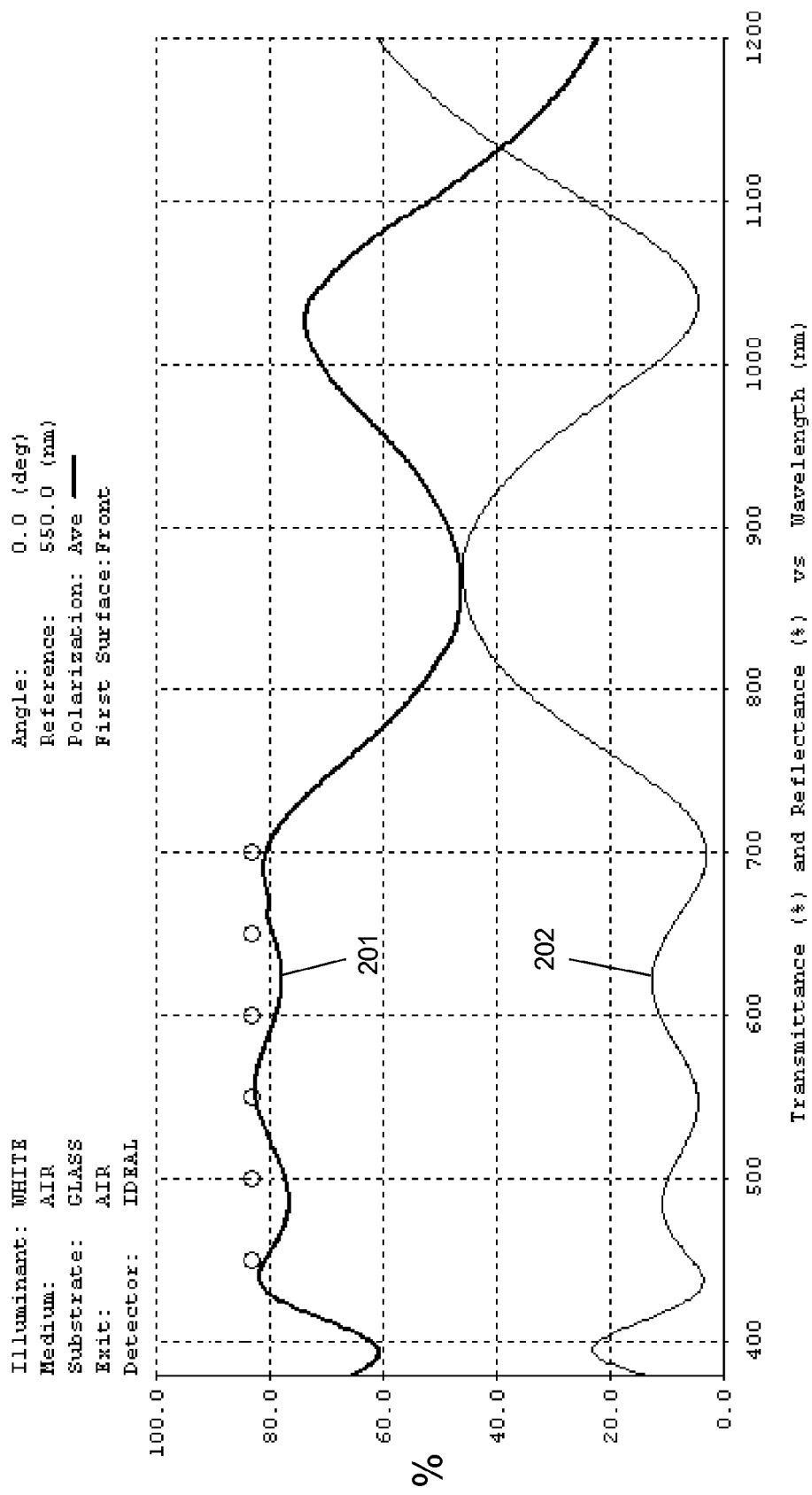
FIG. 2 shows a graph of the percentage transmittance and the percentage reflectance performance as a function of wavelength for the bleached state for the exemplary embodiment of the electrochromic device depicted in FIG. 1.
Figure 3:
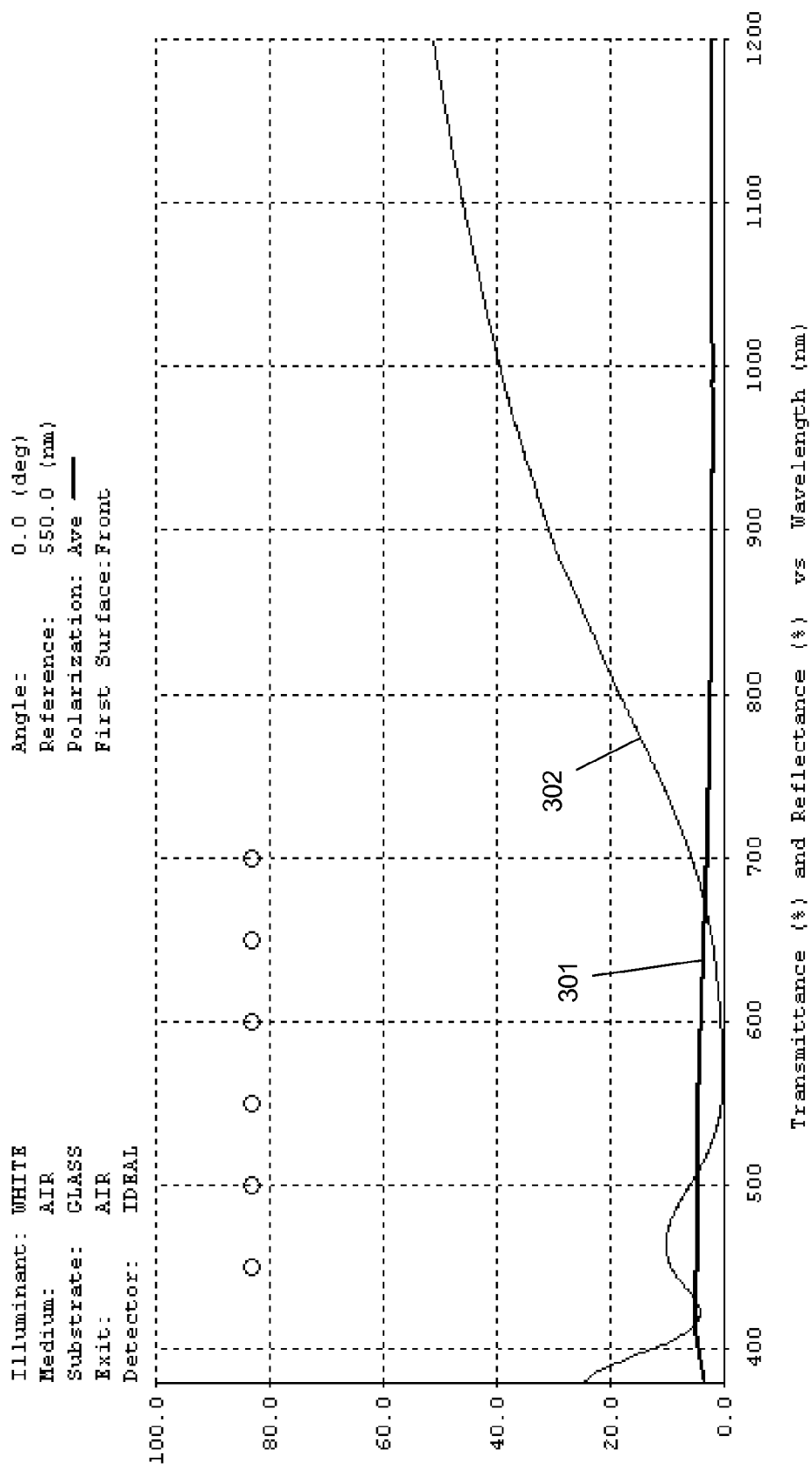
FIG. 3 shows a graph of the percentage transmittance and the percentage reflective performance as a function of wavelength for the colored state of the exemplary embodiment of the electrochromic device depicted in FIG. 1.

FIG. 2 shows a graph of the percentage transmittance 201 and the percentage reflectance 202 performance as a function of wavelength for the bleached state for electrochromic device 100. FIG. 3 shows a graph of the percentage transmittance 301 and the percentage reflective 302 performance as a function of wavelength for the colored state of electrochromic device 100. The graphs of FIGS. 2 and 3 were calculated using the TFCalc software available from Software Spectra, Inc. located in Portland, Oreg. For both FIGS. 2 and 3, the abscissa is wavelength and the ordinate is percentage transmission and percentage reflection. The six small circles appearing in both FIGS. 2 and 3 along the 80% line between about 450 nm and about 700 nm of wavelength represent optimization targets that were used by the TFCalc software. The n and k data for lithiated NiO, lithiated $WO_3$ and for NiO and $WO_3$ were obtained from data on a website provided by Lawrence Livermore Laboratories (http://windows.lbl.gov/materials/chromogenics/N&K-coverpage.html). The n and k data of $Ta_2O_5$, ITO and Ag were obtained from the database associated with the TFCalc software. For silver-based alloys containing between 1-2.5% of copper, gold or palladium, similar results are found because the n and k values are not significantly altered by the alloy composition.

As shown in FIG. 2 for the bleached state, the transmitted luminosity of the exemplary embodiment of FIG. 1 is 80.4% (x'=0.334, y'=0.339 in the CIE coordinate system). From FIG. 3, for the colored state, the transmitted luminosity is 4.5% (x'=0.314, y'=0.326 in the CIE coordinate system). The dynamic range for the exemplary embodiment of electrochromic device 100 is 17.9:1.0. Other exemplary embodiments of the subject matter disclosed herein have at least a 12:1 dynamic range between the bleached state and the colored state.

For the exemplary embodiment of FIG. 1, a thickness of about 562 nm of material is between the first and second metal conductor (Ag) layers 103 and 109. This is almost twice the thickness of the electrochromic device disclosed in U.S. Pat. No. 5,757,537 to Ellis, Jr. et al. Thus, an electrochromic device according to the subject matter disclosed herein can be fabricated to have layer thicknesses that provide reliable functioning of the electrochromic device.

Figure 4A:
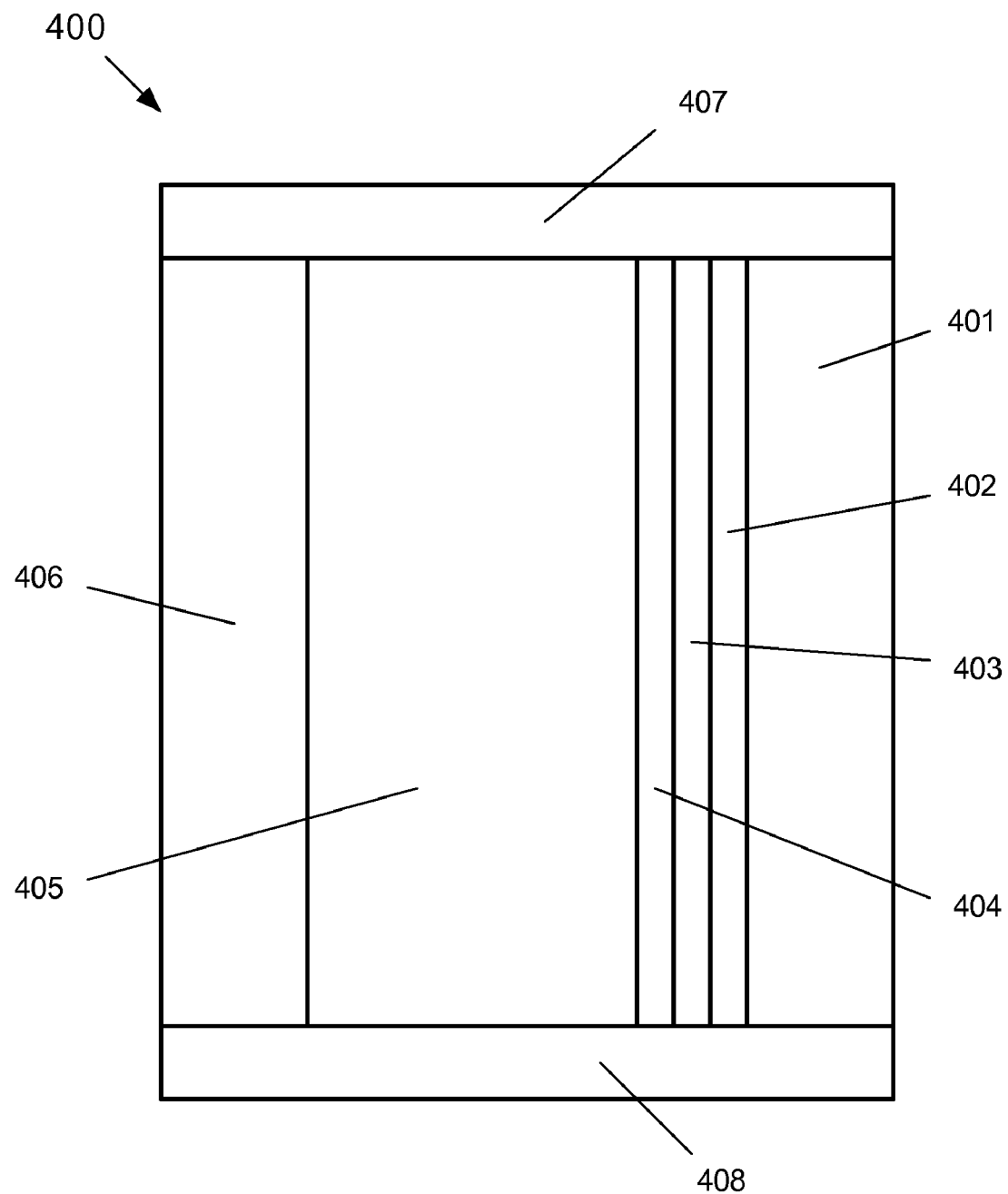
FIG. 4A depicts an exemplary embodiment of a dual-pane window assembly comprising a low-e coating and an electrochromic device according to the subject matter disclosed herein.

According to one aspect of the subject matter disclosed herein, a low-e coating can be applied to one or both of glass substrates 101 and 112, thereby providing a high transmission that is on the order of 60% for light in the visible region (about 400 nm to about 700 nm) for the whole dual-pane window while providing high infrared reflectance, that is, high solar reflection, or blocking, for wavelengths of about 700 nm to about 1200 nm and larger. FIG. 4A depicts an exemplary embodiment of a dual-pane window assembly 400 comprising a low-e coating and an electrochromic device according to the subject matter disclosed herein. Dual-pane window assembly 400 comprises a first glass pane 401, a low-e coating 402 formed in a well-known manner on pane 401, a plastic film 403 bonded in a well-known manner to low-e coating 402, an electrochromic device 404, an airspace 405, and a second pane of glass 406. Sealants 407 and 408 are provided in a well-known manner to seal dual-pane window 400. It should be understood that other sealants could be included, but are not shown in FIG. 4A for clarity. Additionally, an adhesive that is used for attaching plastic film 403 to low-e coated glass pane 401 is not shown in FIG. 1 for clarity. Furthermore, use of a plastic film between the low-e coating (one device) and the EC coating (other device) allows for separate interference effects such that each device operates independently from the other.

Glass pane 401 corresponds to glass substrate 101 in FIG. 1. Electrochromic device 404 corresponds to layers 102 through 110 of electrochromic device 100 of FIG. 1. Air space 405 corresponds to air space 111 in FIG. 1, and glass pane 406 corresponds to glass substrate 112 in FIG. 1. Plastic film 403 provides improved safety in the event glass pane 401 is broken. In one exemplary embodiment, plastic film 403 is a laminated plastic may be non-tinted, or tinted to help control any reflected or transmitted color.

Because low-e coating 402 effectively shields electrochromic (EC) device from solar heat, EC device 404, particularly the dual-cavity EC device (FIG. 5), could alternatively be formed on glass pane 406 on the opposite side of the air space. For this exemplary alternative embodiment, plastic film 403 and the adhesive (not shown) can be eliminated and EC 404 device would operate primarily as a privacy screen.

Figure 4B:
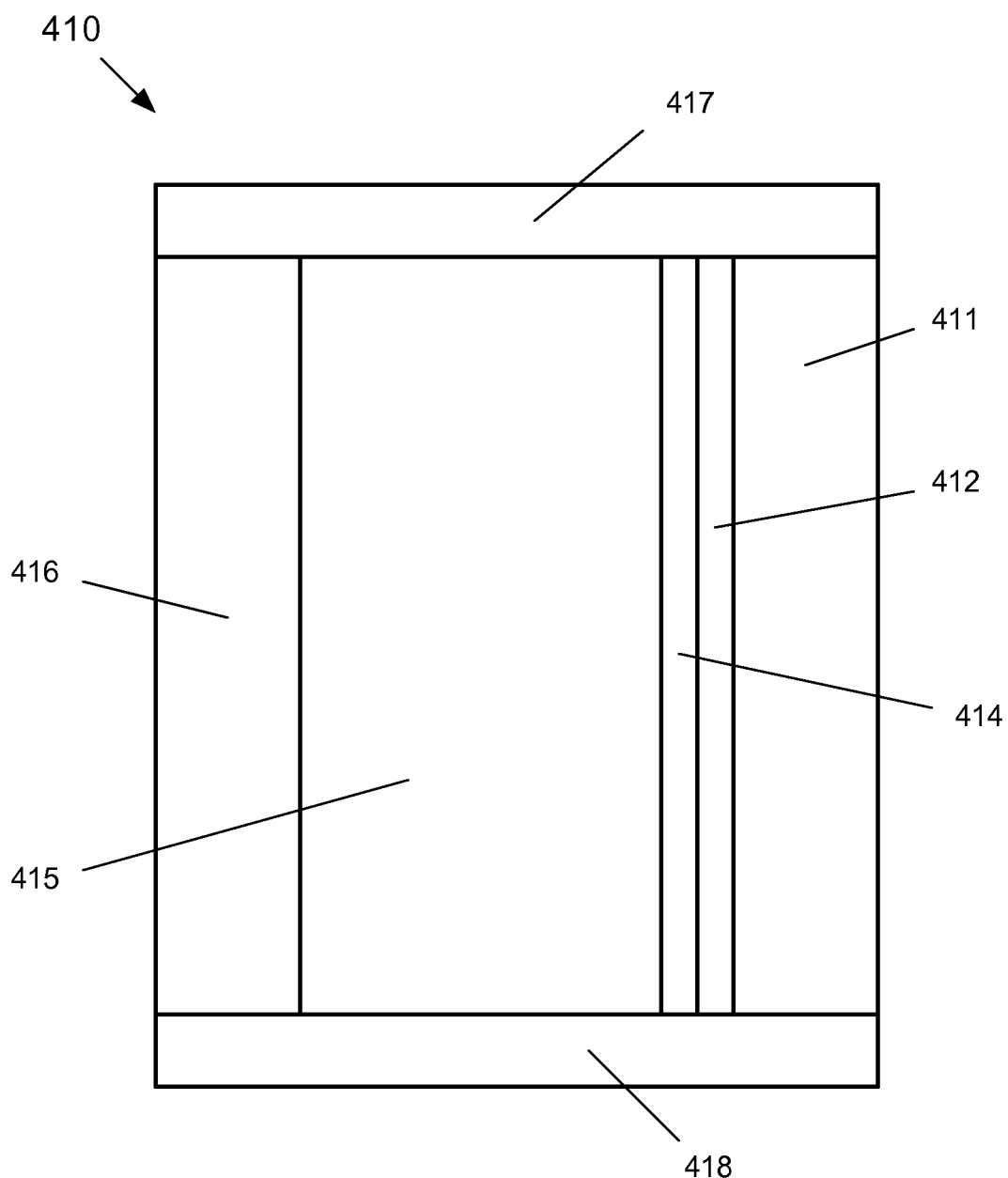
FIG. 4B depicts another exemplary embodiment of a dual-pane window assembly comprising a low-e coating and an electrochromic device according to the subject matter disclosed herein.

FIG. 4B depicts another exemplary embodiment of a dual-pane window 410 comprises a first glass pane 411, a low-e coating 412 formed in a well-known manner on pane, an electrochromic device 414, an airspace 415, and a second pane of glass 416. Low-e coating 412 is formed in accordance with the low-e coatings disclosed by U.S. Pat. No. 7,339,728 B2 to Hartig, which is incorporated by reference herein. At least one of the silver-based reflector layers of the Hartig-type low-e coating is used as a transparent conductive electrode for electrochromic device 414. Sealants 417 and 418 are provided in a well-known manner to seal dual-pane window 410. It should be understood that other sealants could be included, but are not shown in FIG. 4B for clarity. A plastic film (not shown in FIG. 4B) could be bonded in a well-known manner to electrochromic device 414 between electrochromic device 414 and air space 415 to provide improved safety in the event glass pane 411 is broken. In one exemplary embodiment, the plastic film is a laminated plastic may be non-tinted, or tinted to help control any reflected or transmitted color.

Figure 5A:
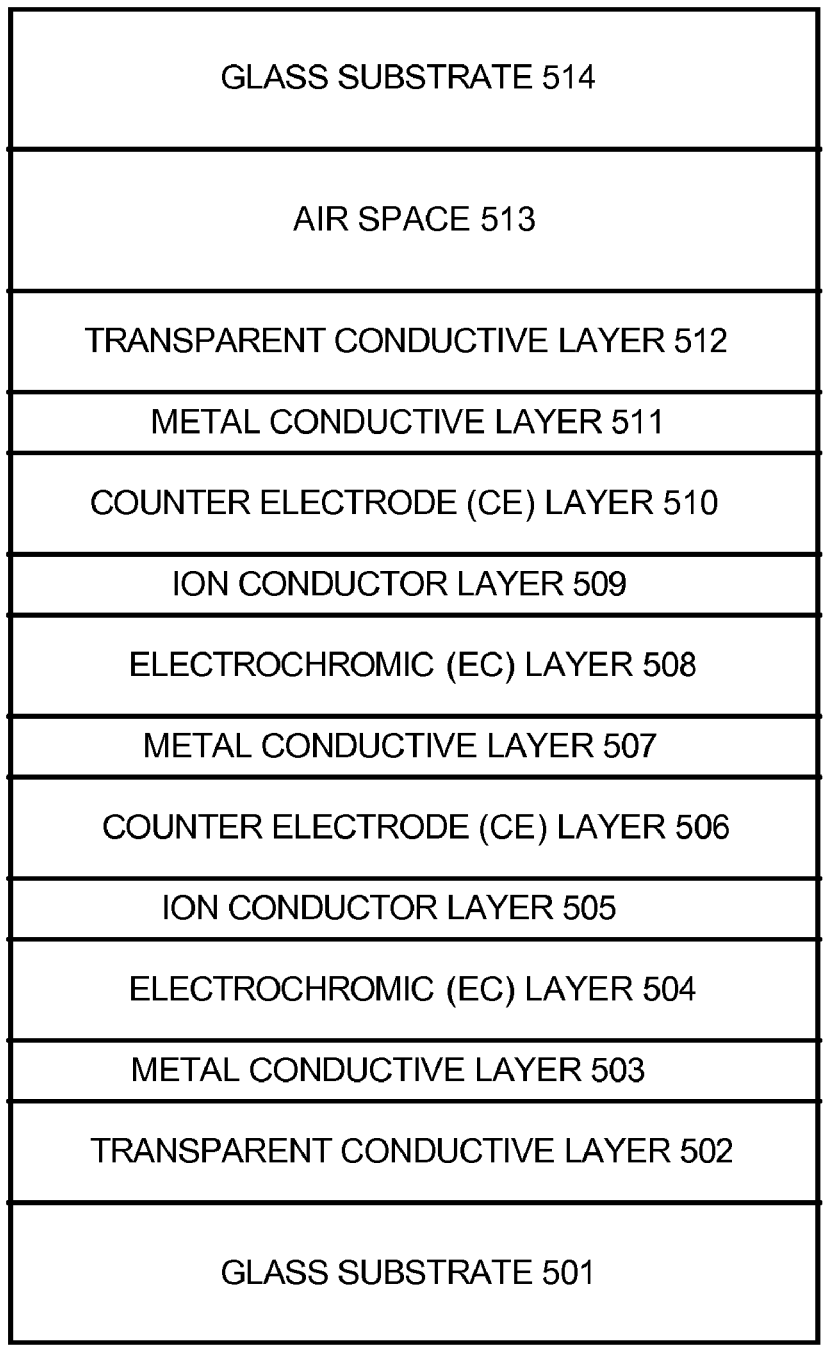
FIG. 5A depicts a first exemplary embodiment of a dual-cavity electrochromic device according to the subject matter disclosed herein.

Another exemplary embodiment of the subject matter disclosed herein utilizes a dual-cavity configuration in which the electrochromic components are positioned between metal conductive silver layers to achieve excellent electrochromic performance. FIG. 5A depicts a first exemplary embodiment of a dual-cavity electrochromic device 500 according to the subject matter disclosed herein. Dual-cavity electrochromic device 500 comprises a glass substrate 501, a transparent conductive dielectric layer 502, a metal conductive layer 503, an electrochromic (EC) layer 504, an ion conductor (IC) layer 505, a counter electrode (CE) 506, a metal conductor layer 507, an electrochromic (EC) layer 508, an ion conductor (IC) layer 509, a counter electrode (CE) layer 510, a metal conductor layer 511, a transparent conductive dielectric layer 512, an air space 513 and a glass substrate 514. It should be understood that the relative positions of the electrochromic (EC) layers and counter electrode layers with respect to ion conductor layers of at least one electrochromic structure could be reversed. That is, electrochromic device 500 could be formed so that the order of an electrochromic (EC) layer, ion conductor (IC) layer and a counter electrode (CE) layer of at least one electrochromic structure could be reversed. Moreover, electrochromic device 500 could be formed in accordance with the multi-layer electrochromic devices disclosed in copending and co-assigned U.S. patent Ser. No. 12/145,846, invented by Roger W. Phillips, entitled "Multi-cell Solid-State Electrochromic Device," filed Jun. 25, 2008, which is incorporated by reference herein. Additionally, electrical connections to the electrochromic device are made in a well-known manner, but are not shown in FIG. 5A for clarity.

Glass substrates 501 and 514 are typically a float glass having an index of refraction of about 1.52. Transparent conductive dielectric layers 502 and 512 are formed in a well-known manner from, for example, indium tin oxide (ITO), fluorine-doped tin oxide, antimony-doped tin oxide, or fluorine-doped zinc oxide. Metal conductive layers 503, 507 and 511 are formed in a well-known manner from silver (Ag). Alternatively, addition of a small amount of Cu, Au or Pd in a metal conductive layer enhances durability of the metal conductive layer. Metal conductor layers 503, 507 and 511 could be formed in a well-known manner from Al or Cu, but would provide a transmittance in the bleached state for the electrochromic device that would be less than if Ag or if a small amount of Cu, Au or Pd were used as alloying additions in the Ag for the metal conductor layer. This alternative embodiment could be used for applications in which privacy is a higher priority. Electrochromic (EC) layers 504 and 508 are formed in a well-known manner from, for example, tungsten oxide $WO_3$, vanadium oxide $V_2O_5$, niobium oxide $Nb_2O_5$ and iridium oxide $IrO_2$. Ion conductor (IC) layers 505 and 509 are formed in a well-known manner from, for example, tantalum oxide $Ta_2O_5$, silicon oxide $SiO_2$, titanium oxide $TiO_2$, and aluminum oxide $Al_2O_3$, or mixtures of these compounds. Counter electrode (CE) layers 506 and 510 are formed in a well-known manner from, for example, nickel oxide NiO, tungsten-doped nickel oxide, and iridium oxide $IrO_2$. Alternatively, counter electrode (CE) layers 506 and 510 could be formed in a well-known manner from ternary oxide alloys such as $NiO:WO_3:MoO_3$, $NiO:MoO_3:Ta_2O_5$, and $NiO:WO_3:Ta_2O_5$. Air space 513 for a particular embodiment of an insulated glass unit (IGU) would have a thickness, or width, that would be selected to minimize both conductive heat transport and convective heat transport. Typically for an insulated glass unit (IGU), the thickness of the glass ranges from about 3 mm to about 6 mm for each lite. Generally, decreasing the air space thickness increases conductive transport. Increasing air space thickness above the optimum air space thickness increases convective loss. Generally, the optimum air space thickness is taken to be about 12 mm.

For the exemplary embodiment depicted in FIG. 5A, the following materials and thicknesses for the various layers were selected, as follows, and then transmission and reflectance performance was calculated using the Film Wizard software and are shown in FIGS. 6-9. Similar results were obtained using the TFCalc software. Transparent conductive dielectric layer 502 was selected to be ITO having a thickness of 34.6 nm. Metal conductive layer 503 was selected to be Ag having a thickness of 7 nm. Electrochromic (EC) layer 504 was selected to be $WO_3$ having a thickness of 88.71 nm. Ion conductor (IC) layer 505 was selected to be $Ta_2O_5$ having a thickness of 72.78 nm. Counter electrode (CE) 506 was selected to be NiO having a thickness of 100.59 nm. Metal conductor layer 507 was selected to be Ag having a thickness of 8 nm. Electrochromic (EC) layer 508 was selected to be $WO_3$ having a thickness of 87.45 nm. Ion conductor (IC) layer 509 was selected to be $Ta_2O_5$ having a thickness of 68.21 nm. Counter electrode (CE) layer 510 was selected to be NiO having a thickness of 104.93 nm. Metal conductor layer 511 was selected to be Ag having a thickness of 7 nm. Transparent conductive dielectric layer 512 was selected to be ITO having a thickness of 33.09 nm.

Figure 5B:
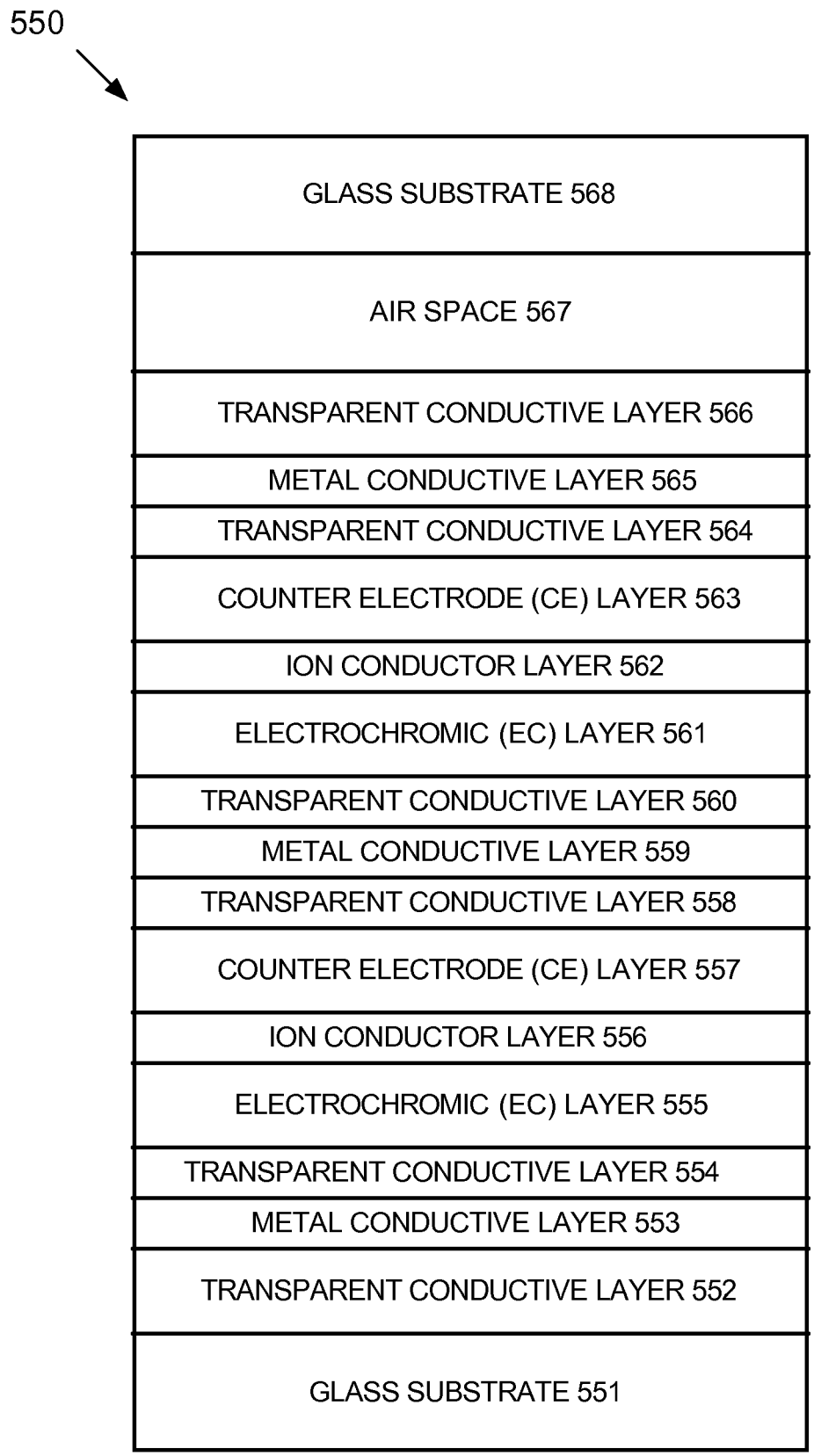
FIG. 5B depicts a second exemplary embodiment of a dual-cavity electrochromic device according to the subject matter disclosed herein.

FIG. 5B depicts a second exemplary embodiment of a dual-cavity electrochromic device 550 according to the subject matter disclosed herein. Dual-cavity electrochromic device 550 comprises a glass substrate 551, a first transparent conductive dielectric layer 552, a metal conductive layer 553, a transparent conductive dielectric layer 554, an electrochromic (EC) layer 555, an ion conductor (IC) layer 556, a counter electrode (CE) 557, a transparent conductive dielectric layer 558, a metal conductor layer 559, a transparent conductive dielectric layer 560, an electrochromic (EC) layer 561, an ion conductor (IC) layer 562, a counter electrode (CE) layer 563, a transparent conductive dielectric layer 564, a metal conductor layer 565, a transparent conductive dielectric layer 566, an air space 567 and a glass substrate 568. It should be understood that the relative positions of the electrochromic (EC) layers and counter electrode layers with respect to ion conductor layers could be reversed. Further, it should be understood that the various layers 552-566 forming dual-cavity electrochromic device 550 could be formed on the side of glass substrate 551 that is opposite from air space 567. Additionally, electrical connections to the electrochromic device are made in a well-known manner, but are not shown in FIG. 5B for clarity.

Glass substrates 551 and 568 are typically a float glass having an index of refraction of about 1.52. Transparent conductive dielectric layers 552, 554, 558, 560, 564 and 566 are formed in a well-known manner from, for example, indium tin oxide (ITO), fluorine-doped tin oxide, antimony-doped tin oxide, or fluorine-doped zinc oxide. Metal conductive layers 553, 559 and 565 are formed in a well-known manner from silver (Ag). Alternatively, addition of a small amount of Cu, Au or Pd in a metal conductive layer enhances durability of the metal conductive layer. Metal conductor layers 553, 559 and 565 could be formed in a well-known manner from Al or Cu, but would provide a transmittance in the bleached state for the electrochromic device that would be less than if Ag or if a small amount of Cu, Au or Pd were used as alloying additions in the Ag for the metal conductor layer. This alternative embodiment could be used for applications in which privacy is a higher priority. Electrochromic (EC) layers 555 and 561 are formed in a well-known manner from, for example, tungsten oxide $WO_3$, vanadium oxide $V_2O_5$, niobium oxide $Nb_2O_5$ and iridium oxide $IrO_2$. Ion conductor (IC) layers 556 and 562 are formed in a well-known manner from, for example, tantalum oxide $Ta_2O_5$, silicon oxide $SiO_2$, titanium oxide $TiO_2$, and aluminum oxide $Al_2O_3$, or mixtures of these compounds. Counter electrode (CE) layers 557 and 563 are formed in a well-known manner from, for example, nickel oxide NiO, tungsten-doped nickel oxide, and iridium oxide $IrO_2$. Alternatively, counter electrode (CE) layers 557 and 563 could be formed in a well-known manner from ternary oxide alloys such as $NiO:WO_3:MoO_3$, $NiO:MoO_3:Ta_2O_5$, and $NiO:WO_3:Ta_2O_5$. Air space 567 for a particular embodiment of an insulated glass unit (IGU) would have a thickness, or width, that would be selected to minimize both conductive heat transport and convective heat transport. Typically, in an insulated glass unit (IGU), the thickness of the glass ranges from about 3 mm to about 6 mm for each lite. Generally, decreasing the air space thickness increases conductive transport. Increasing air space thickness above the optimum air space thickness increases convective loss. Generally, the optimum air space thickness is taken to be about 12 mm.

For the exemplary embodiment depicted in FIG. 5B, the following materials and thicknesses for the various layers were selected, as follows, and then transmission and reflectance performance was calculated using the Film Wizard software and the TFCalc software. The results were similar to the results obtained for the exemplary embodiment of FIG. 5A and are shown in FIGS. 10-13. Transparent conductive dielectric layer 552 was selected to be ITO having a thickness of 34.6 nm. Metal conductive layer 553 was selected to be Ag having a thickness of 7 nm. Transparent conductive dielectric layer 554 was selected to be ITO having a thickness of 6 nm. Electrochromic (EC) layer 555 was selected to be $WO_3$ having a thickness of 88.71 nm. Ion conductor (IC) layer 556 was selected to be $Ta_2O_5$ having a thickness of 72.78 nm. Counter electrode (CE) 557 was selected to be NiO having a thickness of 100.59 nm. Transparent conductive dielectric layer 558 was selected to be ITO having a thickness of 6 nm. Metal conductor layer 559 was selected to be Ag having a thickness of 8 nm. Transparent conductive dielectric layer 560 was selected to be ITO having a thickness of 6 nm. Electrochromic (EC) layer 561 was selected to be $WO_3$ having a thickness of 87.45 nm. Ion conductor (IC) layer 562 was selected to be $Ta_2O_5$ having a thickness of 68.21 nm. Counter electrode (CE) layer 563 was selected to be NiO having a thickness of 104.93 nm. Transparent conductive dielectric layer 564 was selected to be ITO having a thickness of 6 nm. Metal conductor layer 565 was selected to be Ag having a thickness of 7 nm. Transparent conductive dielectric layer 565 was selected to be ITO having a thickness of 33.09 nm.

It should be understood that either of the exemplary embodiments depicted in FIGS. 5A and 5B could be formed on a low-e coating in accordance with the exemplary embodiments depicted in FIGS. 4A and 4B.

Figure 6:
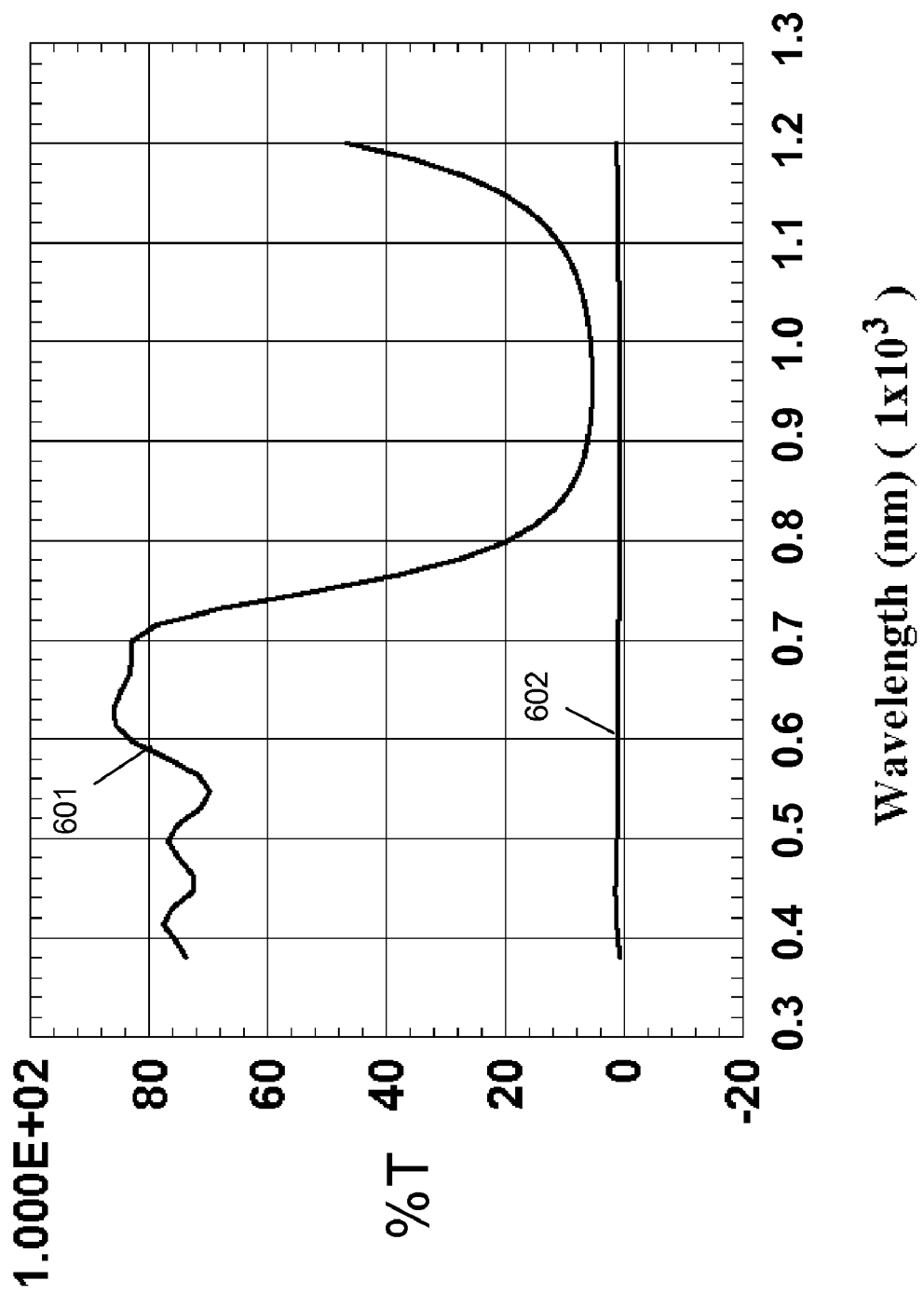
FIG. 6 shows a graph of percentage transmission for the clear state and the colored state for selected materials and thicknesses for the exemplary embodiment of the dual-cavity electrochromic device depicted in FIG. 5A.
Figure 7:
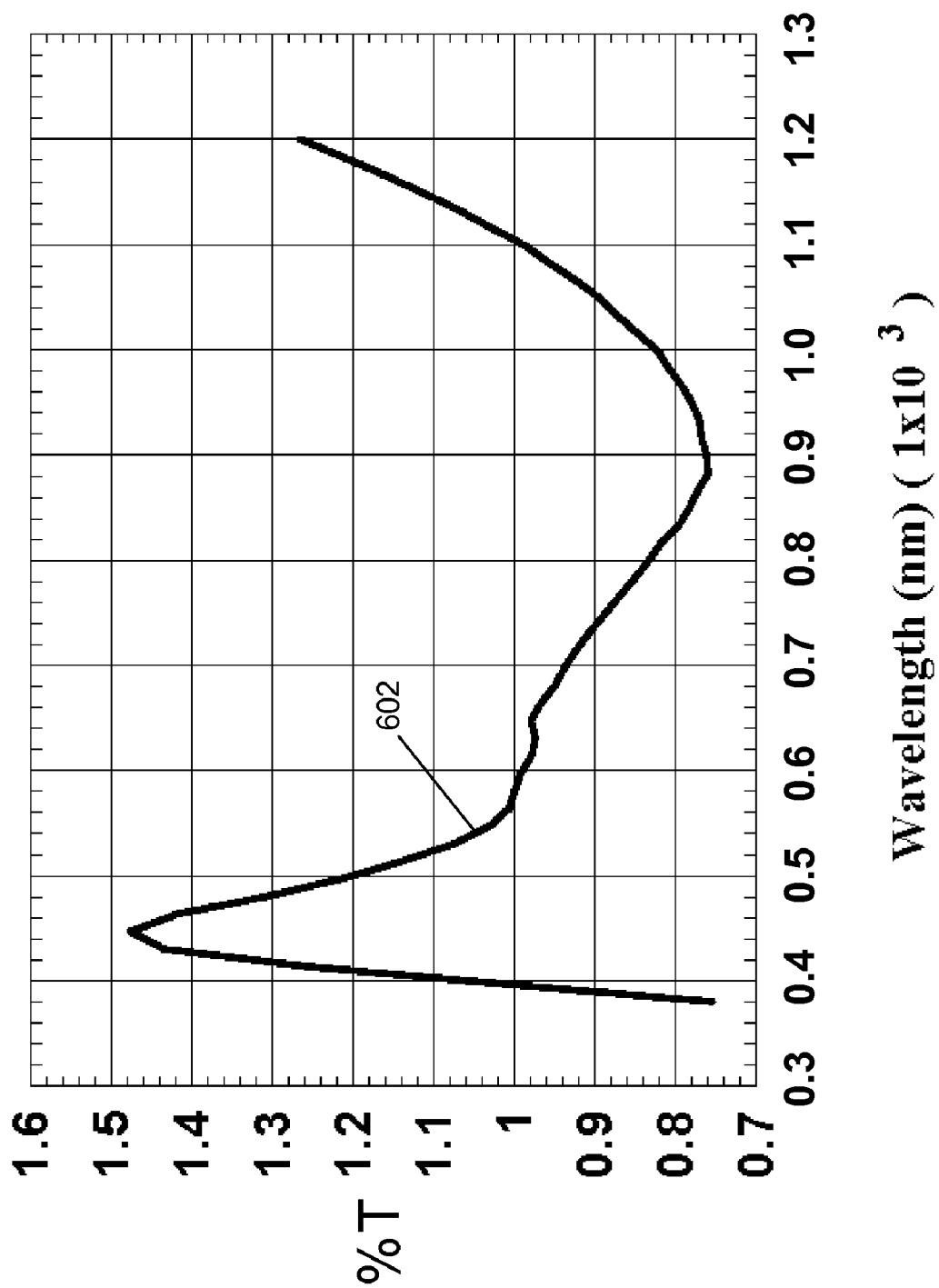
FIG. 7 shows a graph of percentage transmission for the colored state for selected materials and thickness for the exemplary embodiment of the dual-cavity electrochromic device depicted in FIG. 5A in which the scale of the percentage transmission has been expanded.

FIG. 6 shows a graph of percentage transmission for the clear state 601 and the colored state 602 for the selected materials and thicknesses for the exemplary embodiment of FIG. 5A. FIG. 7 shows a graph of percentage transmission for the colored state 602 for the selected materials and thickness for the exemplary embodiment of FIG. 5A in which the scale of the percentage transmission has been expanded. For both FIGS. 6 and 7, the abscissa is wavelength and the ordinate is percentage transmission.

Figure 10:
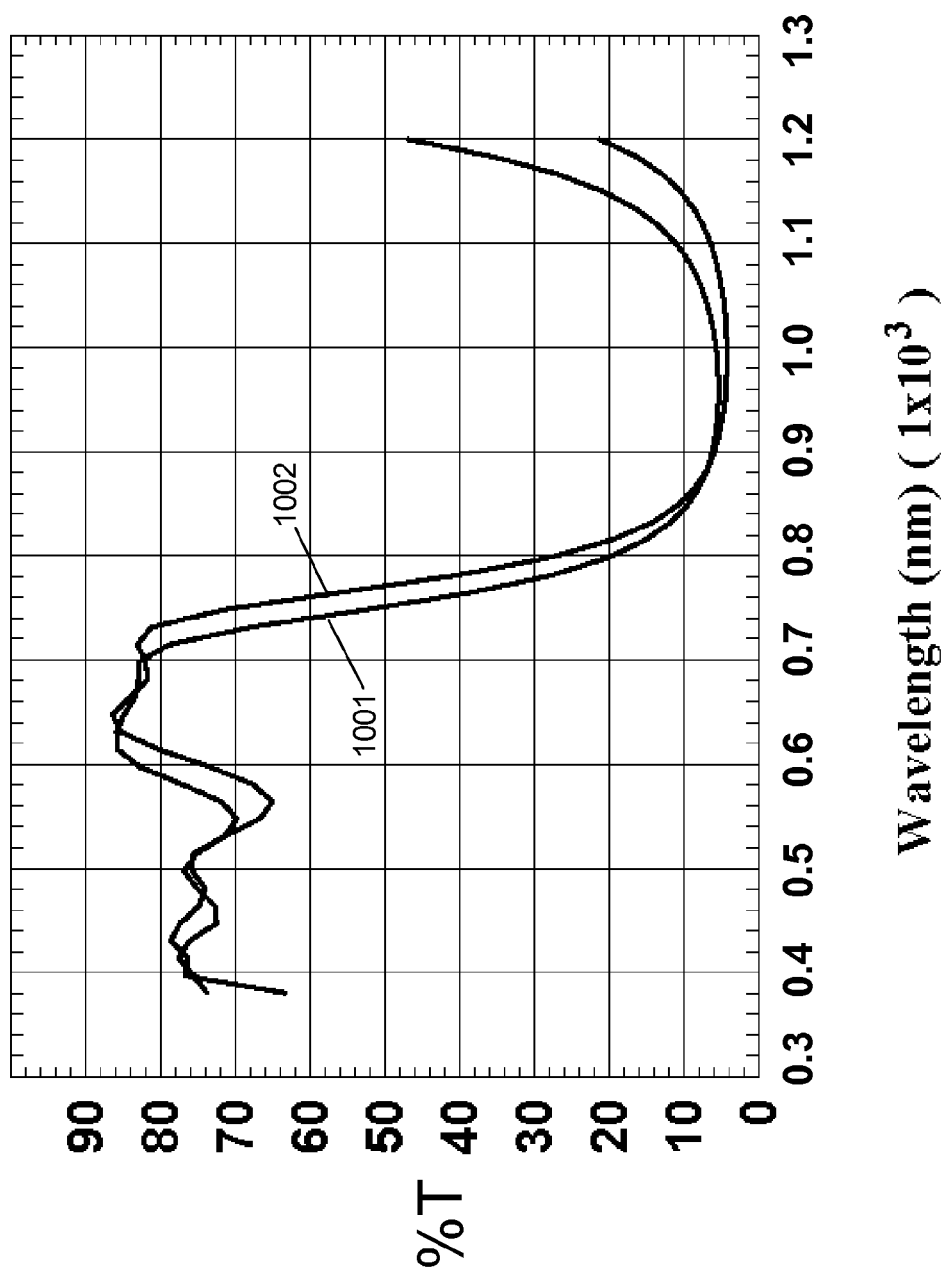
FIG. 10 shows a graph of percentage transmission for the clear state for selected materials and thicknesses for the exemplary embodiments of the dual-cavity electrochromic devices depicted in FIGS. 5A and 5B.
Figure 11:
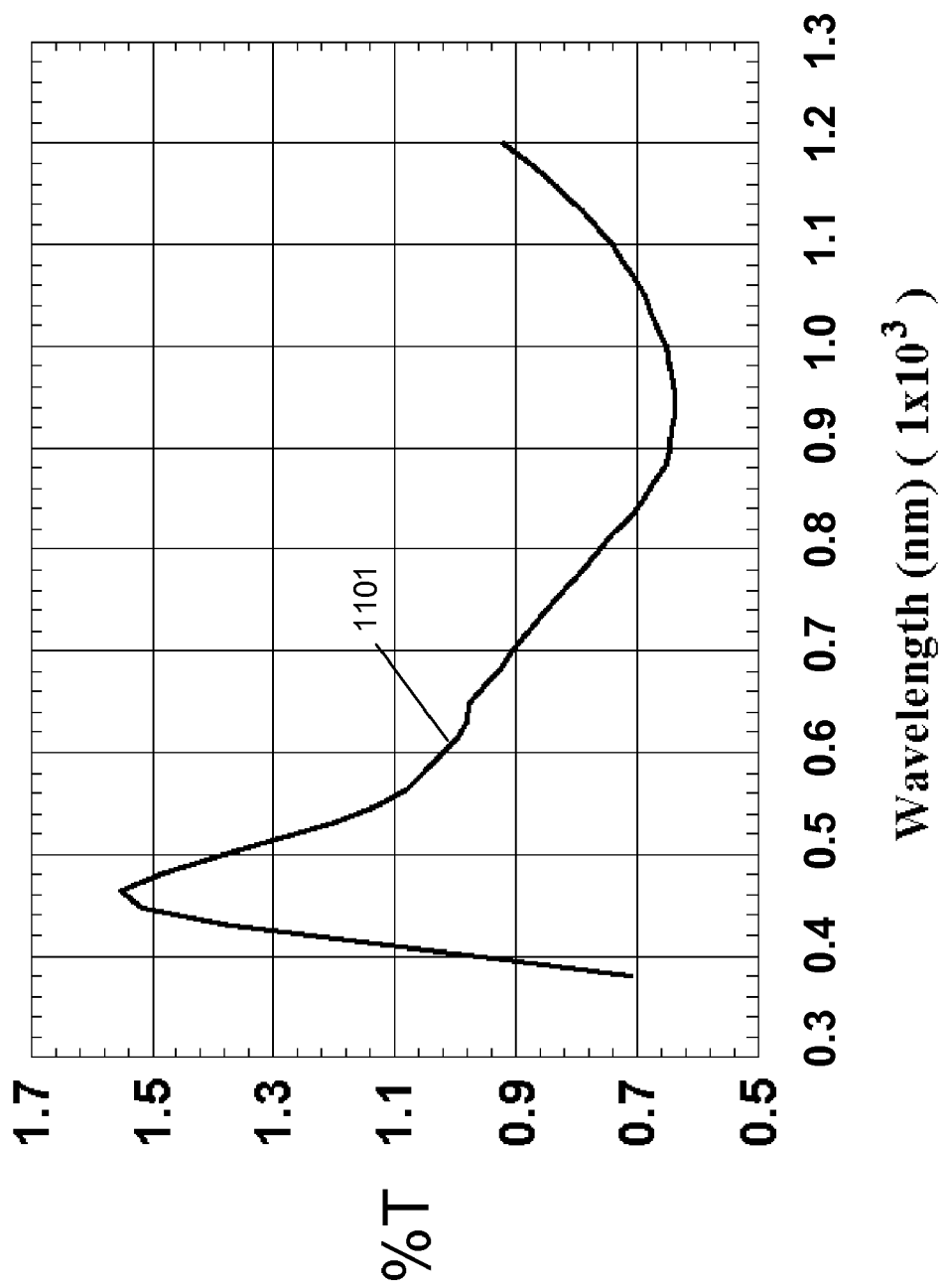
FIG. 11 shows a graph of percentage transmission for the colored state for selected materials and thickness for the exemplary embodiment of the dual-cavity electrochromic device depicted in FIG. 5B in which the scale of the percentage transmission has been expanded.

FIG. 10 shows a graph of percentage transmission for the clear state 1001 for the exemplary embodiment of FIG. 5A in comparison to percentage transmission for the clear state 1002 for the exemplary embodiment of FIG. 5B for the selected materials and thicknesses. FIG. 11 shows a graph of percentage transmission for the colored state 1101 for the selected materials and thickness for the exemplary embodiment of FIG. 5B in which the scale of the percentage transmission has been expanded. For both FIGS. 10 and 11, the abscissa is wavelength and the ordinate is percentage transmission.

For the calculations shown in FIGS. 6, 7, 10 and 11, Film Wizard software available from Scientific Computing International located in Carlsbad, Calif. was used. The n and k values for the lithiated and non-lithiated $WO_3$ and NiO, and the non-lithiated ITO (Indium Tin Oxide) were obtained from Lawrence Berkeley Laboratories at http://windows.lbl.gov/materials/chromogenics/N&K-coverpage.html. The n and k values for $Ta_2O_5$ were obtained from http://www.kruschwitz.com/Ta2O5.htm. The n and k values for silver (Ag) were obtained from the Material Data Base of the Film Wizard software.

The color of the transmitted and reflected beams can be plotted in the CIE coordinate system. The $L^*a^*b^*$ system can also be used. In the case of the $L^*a^*b^*$ system, by convention, $+a^*$ is on the red axis, $-a^*$ is on the green axis, $+b^*$ is on the yellow axis and $-b^*$ is on the blue axis. $L^*$ is the brightness value. The achromatic point, that is, the point of no color, is at 0.3 on each axis for the CIE coordinate system, and $a^*=0$ and $b^*=0$ in the $L^*a^*b^*$ system, in which higher chroma arises as the distance increases outward from the achromatic point.

Figure 8:
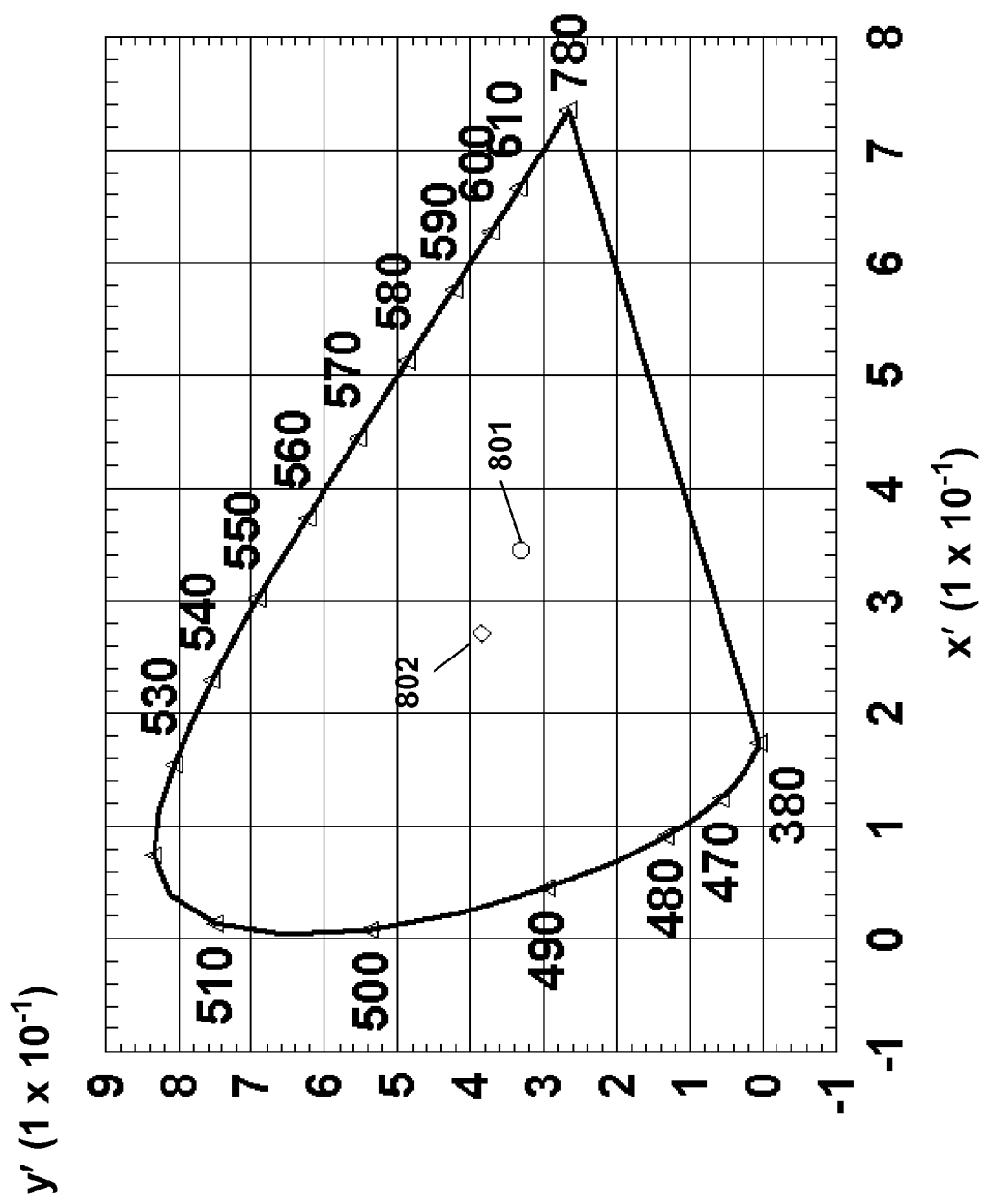
FIG. 8 shows the color of the transmitted and reflected light within the CIE x'y' coordinate system for the clear state of the exemplary embodiment of the dual-cavity electrochromic device depicted in FIG. 5A.
Figure 9:
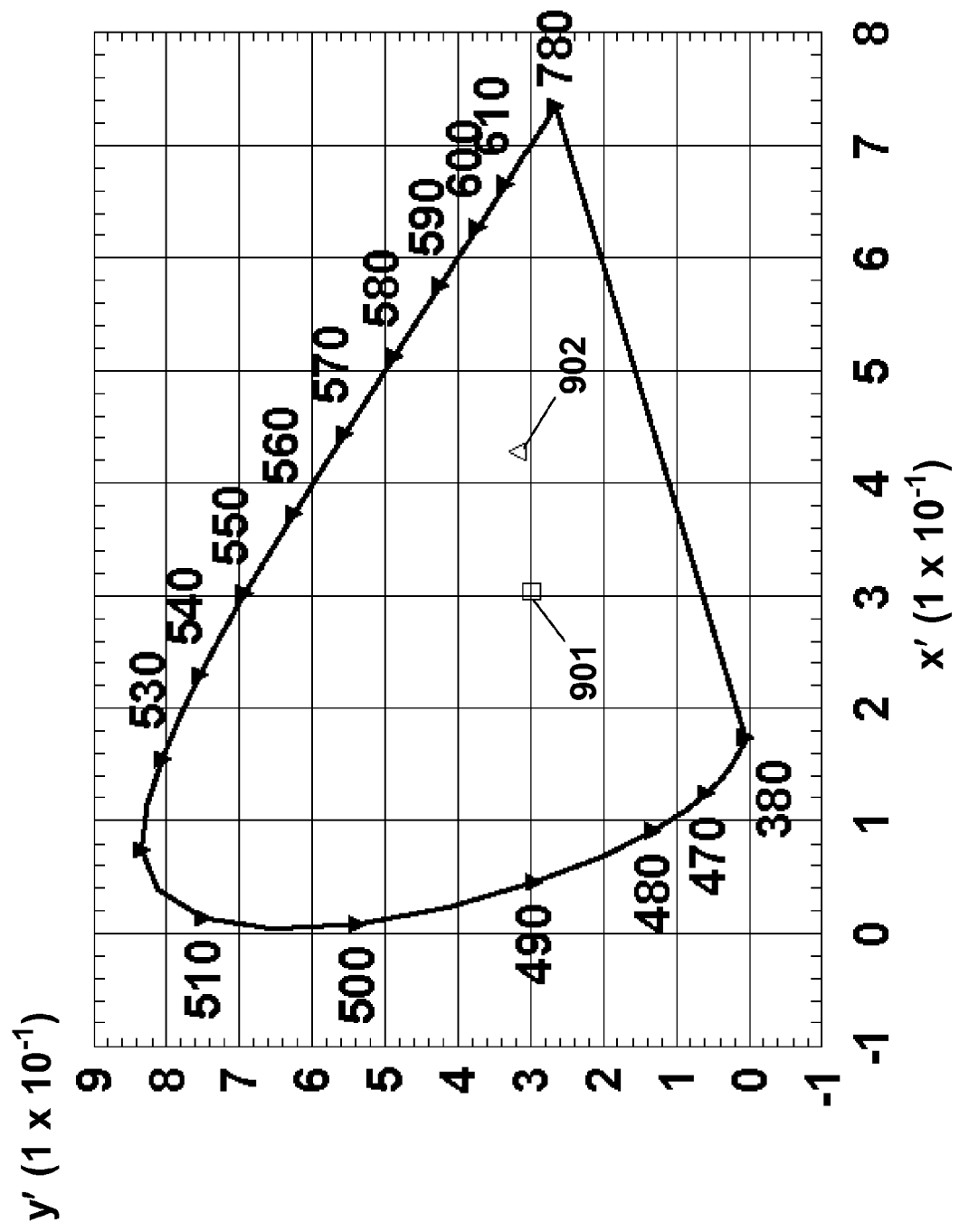
FIG. 9 shows the color of the transmitted and reflected light within the CIE x'y' coordinate system for the colored state of the exemplary embodiment of the dual-cavity electrochromic device depicted in FIG. 5A.

For the exemplary embodiment of the dual-cavity electrochromic device depicted in FIG. 5A, the color of the transmitted and reflected light is shown in FIG. 8 for the clear, or bleached, state and in FIG. 9 for the dark, or colored, state. In FIG. 8, point 801 represents the calculated transmittance for the clear state, which occurs at x'=0.345, y'=0.331 of the CIE x'y' coordinate system. Point 802 represents the calculated reflectance for the clear state, which occurs at x'=0.271, y'=0.385. In FIG. 9, point 901 represents the calculated transmittance for the colored state, which occurs at x'=0.303, y'=0.298. Point 902 represents the calculated reflectance for the colored state, which occurs at x'=0.428, y'=0.318. Note that the color of the transmitted beam is the same in either direction, but that the reflected color is the color seen from the room as the reflected color is reflected from the air side of the electrochromic device. The values were calculated for a 2-degree viewing angle of the CIE "standard observer" function with white light illumination.

For comparison, $L^*$, $a^*$ and $b^*$ for the exemplary embodiment of FIG. 5A are shown in the Table 1 below;

TABLE 1

Color Properties of Dual-Cavity EC Device

|  | CIE x' | CIE y' | L* | a* | b* |
| --- | --- | --- | --- | --- | --- |
| Dual-Cavity Clear |  |  |  |  |  |
| Transmission | 0.345 | 0.331 | 89.8 | 6.41 | 1.33 |
| Reflection | 0.271 | 0.385 | 41.85 | 27.7 | 3.78 |
| Dual-Cavity Colored |  |  |  |  |  |

TABLE 1-continued

Color Properties of Dual-Cavity EC Device

|  | CIE x' | CIE y' | L* | a* | b* |
| --- | --- | --- | --- | --- | --- |
| Transmission | 0.303 | 0.298 | 9.38 | 0.59 | -4.35 |
| Reflection | 0.428 | 0.318 | 30.3 | 20.8 | 5.75 |

Figure 12:
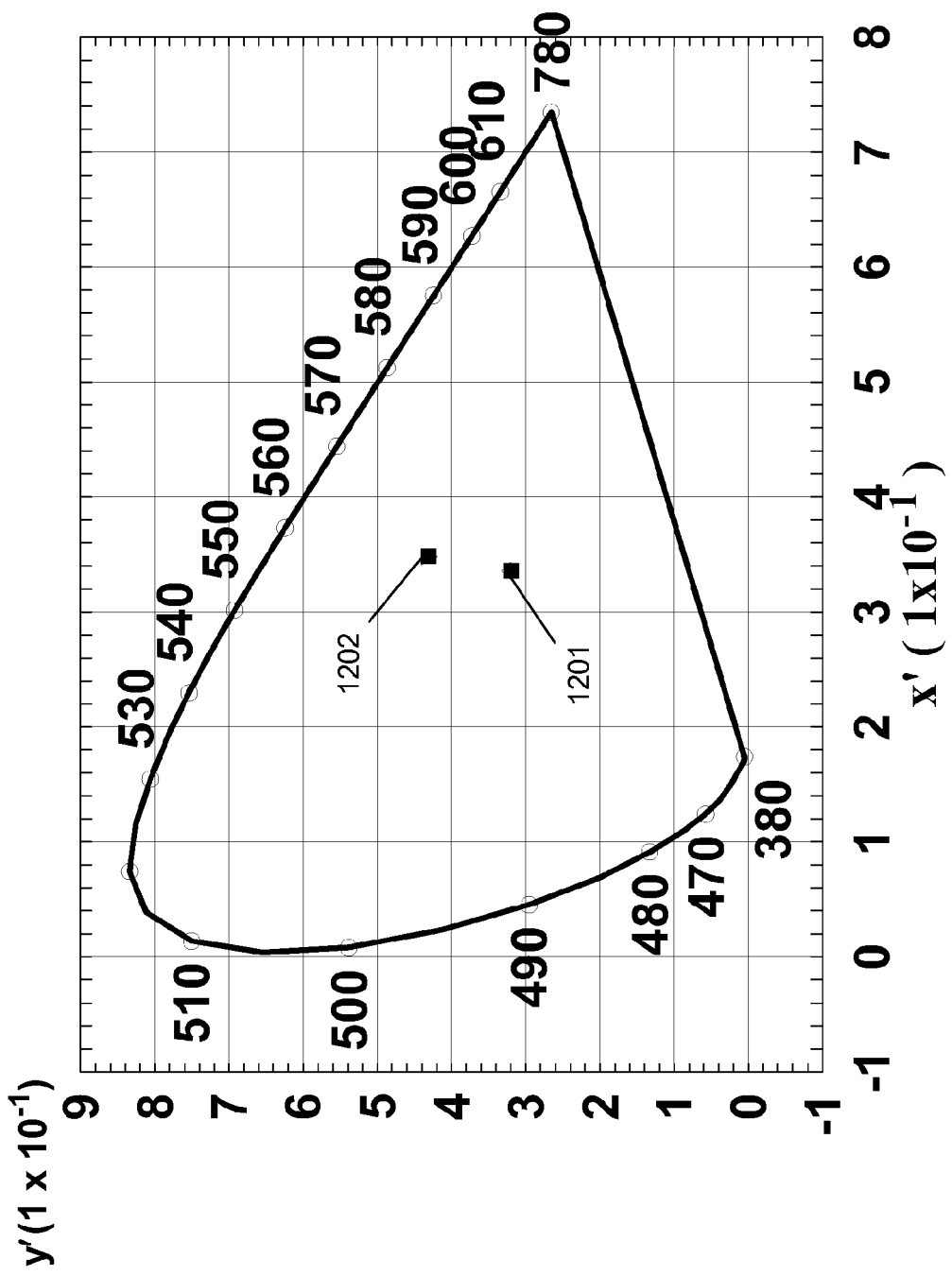
FIG. 12 shows the color of the transmitted and reflected light within the CIE x'y' coordinate system for the clear state of the exemplary embodiment of the dual-cavity electrochromic device depicted in FIG. 5B.
Figure 13:
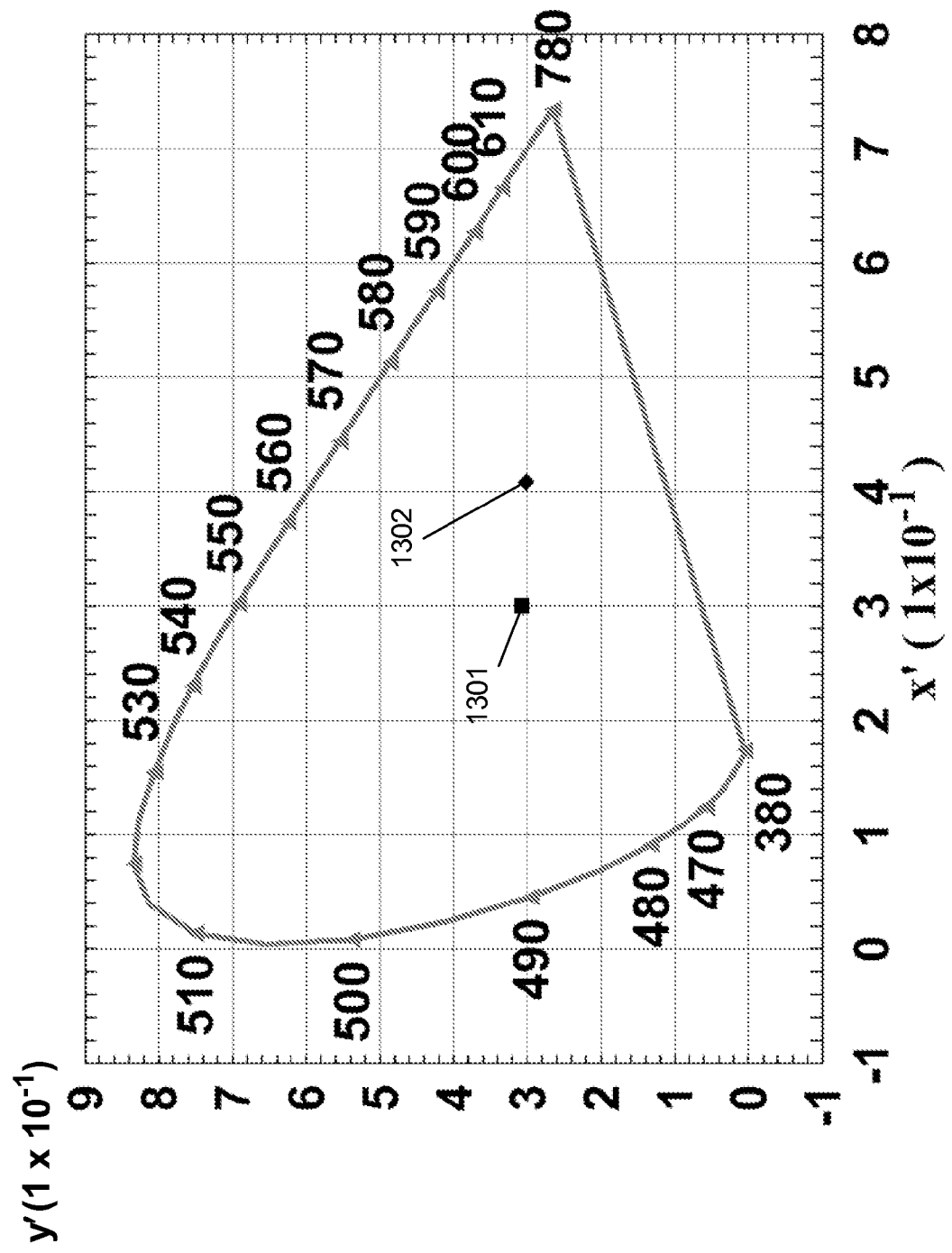
FIG. 13 shows the color of the transmitted and reflected light within the CIE x'y' coordinate system for the colored state of the exemplary embodiment of the dual-cavity electrochromic device depicted in FIG. 5B.

For the exemplary embodiment of the dual-cavity electrochromic device depicted in FIG. 5B, the color of the transmitted and reflected light is shown in FIG. 12 for the clear, or bleached, state and in FIG. 13 for the dark, or colored, state. In FIG. 12, point 1201 represents the calculated transmittance for the clear state, which occurs x'=0.336, y'=0.321 of the CIE x'y' coordinate system. Point 1202 represents the calculated reflectance for the clear state, which occurs at x'=0.348, y'=0.431. In FIG. 13, point 1301 represents the calculated transmittance for the darkened state, which occurs at x'=0.299, y'=0.306. Point 1302 represents the calculated reflectance for the darkened state, which occurs at x'=0.408, y'=0.301. Again, note that the color of the transmitted beam is the same in either direction, but that the reflected color is the color seen from the room as the reflected color is reflected from the air side of the electrochromic device. The values were calculated for a 2-degree viewing angle of the CIE "standard observer function with white light illumination.

Although the foregoing disclosed subject matter has been described in some detail for purposes of clarity of understanding, it will be apparent that certain changes and modifications may be practiced that are within the scope of the appended claims. Accordingly, the present embodiments are to be considered as illustrative and not restrictive, and the subject matter disclosed herein is not to be limited to the details given herein, but may be modified within the scope and equivalents of the appended claims.

What is claimed is:

1. An electrochromic device, comprising:
   a first electrically conductive dielectric layer;
   a first metal conductive layer formed on the first electrically conductive dielectric layer;
   a first electrochromic structure comprising a first side and a second side, the first side of the first electrochromic structure being formed on the first metal conductive layer;
   a second metal conductive layer formed on the second side of the first electrochromic device;
   a second electrochromic structure comprising a first side and a second side, the first side of the second electrochromic structure being formed on the second metal conductive layer;
   a third metal conductor layer formed on the second side of the second electrochromic structure; and
   a second electrically conductive dielectric layer formed on the third metal conductor layer.

2. The electrochromic device according to claim 1, wherein a thickness of the electrochromic device is greater than about 300 nm.

3. The electrochromic device according to claim 1, wherein the first, second and third metal conductor layers form a dual-cavity Fabry-Pérot filter.

4. The electrochromic device according to claim 3, wherein at least one metal conductive layer comprises one of silver and a silver-based alloy.

5. The electrochromic device according to claim 4, wherein the silver-based alloy comprises at least one of copper, gold and palladium.

6. The electrochromic device according to claim 3, wherein at least one of the conductive dielectric layers comprises at least one of indium tin oxide (ITO), fluorine-doped tin oxide, antimony-doped tin oxide, and fluorine-doped zinc oxide.

7. The electrochromic device according to claim 3, wherein a transmission dynamic range between a clear-state and a colored-state of the electrochromic device is at least about 12:1.

8. The electrochromic device according to claim 3, wherein the first electrochromic structure comprises an electrochromic (EC) electrode on the first side and a counter electrode (CE) on the second side, and
wherein the second electrochromic structure comprises an electrochromic (EC) electrode on the first side and a counter electrode (CE) on the second side.

9. The electrochromic device according to claim 3, wherein the first electrochromic structure comprises a counter electrode (CE) on the first side and an electrochromic (EC) electrode on the second side, and
wherein the second electrochromic structure comprises a counter electrode (CE) on the first side and an electrochromic (EC) electrode on the second side.

10. The electrochromic device according to claim 3, wherein the first electrochromic structure comprises an electrochromic (EC) electrode on the first side and a counter electrode (CE) on the second side, and
wherein the second electrochromic structure comprises a counter electrode (CE) on the first side and a electrochromic (EC) electrode on the second side.

11. The electrochromic device according to claim 3, wherein the first electrochromic structure comprises counter electrode (CE) on the first side and a electrochromic electrode (EC) on the second side, and
wherein the second electrochromic structure comprises an electrochromic electrode (EC) on the first side and a counter electrode (CE) on the second side.

12. The electrochromic device according to claim 3, further comprising:
a third conductive dielectric layer formed between the first metal conductive layer and the first electrochromic structure, and
a fourth conductive dielectric layer formed between the third metal conductive layer and the second electrochromic structure.

13. The electrochromic device according to claim 12, wherein a transmission dynamic range between a clear-state and a colored-state of the electrochromic device is at least about 12:1.

14. The electrochromic device according to claim 13, wherein the first electrochromic structure comprises an electrochromic (EC) electrode on the first side and a counter electrode (CE) on the second side, and
wherein the second electrochromic structure comprises an electrochromic (EC) electrode on the first side and a counter electrode (CE) on the second side.

15. The electrochromic device according to claim 13, wherein the first electrochromic structure comprises a counter electrode (CE) on the first side and an electrochromic (EC) electrode on the second side, and
wherein the second electrochromic structure comprises a counter electrode (CE) on the first side and an electrochromic (EC) electrode on the second side.

16. The electrochromic device according to claim 13, wherein the first electrochromic structure comprises an electrochromic (EC) electrode on the first side and a counter electrode (CE) on the second side, and
wherein the second electrochromic structure comprises a counter electrode (CE) on the first side and a electrochromic (EC) electrode on the second side.

17. The electrochromic device according to claim 13, wherein the first electrochromic structure comprises counter electrode (CE) on the first side and a electrochromic electrode (EC) on the second side, and
wherein the second electrochromic structure comprises an electrochromic electrode (EC) on the first side and a counter electrode (CE) on the second side.

18. The electrochromic device according to claim 12, further comprising a fifth conductive dielectric layer formed between the second metal conductive layer and the first electrochromic structure; and
a sixth conductive dielectric layer formed between the second metal conductive layer and the second electrochromic structure.

19. The electrochromic device according to claim 3, further comprising a third conductive dielectric layer formed between the second metal conductive layer and the first electrochromic structure, and
a fourth conductive dielectric layer formed between the second metal conductive layer and the second electrochromic structure.

20. The electrochromic device according to claim 3, further comprising:
a first glass substrate comprising a low-e coating;
a second glass substrate; and
an air space formed between the low-e coating of the first glass substrate and the second glass substrate,
the electrochromic device being formed on the low-e coating of the first glass substrate.

21. The electrochromic device according to claim 20, further comprising a substantially clear plastic film formed between the low-e coating and the electrochromic device.

22. The electrochromic device according to claim 20, further comprising a tinted plastic film formed between the low-e coating and the electrochromic device.

23. The electrochromic device according to claim 3, further comprising:
a first glass substrate comprising a low-e coating, the low-e coating comprising at least one silver-based reflector layer;
a second glass substrate; and
an air space formed between the low-e coating of the first glass substrate and the second glass substrate,
the electrochromic device being formed on the low-e coating of the first glass substrate so that one of the first and the second metal conductive layer comprise the at least one silver-based reflector layer of the low-e coating.

* * * * *